UNITED STATES PATENT OFFICE.

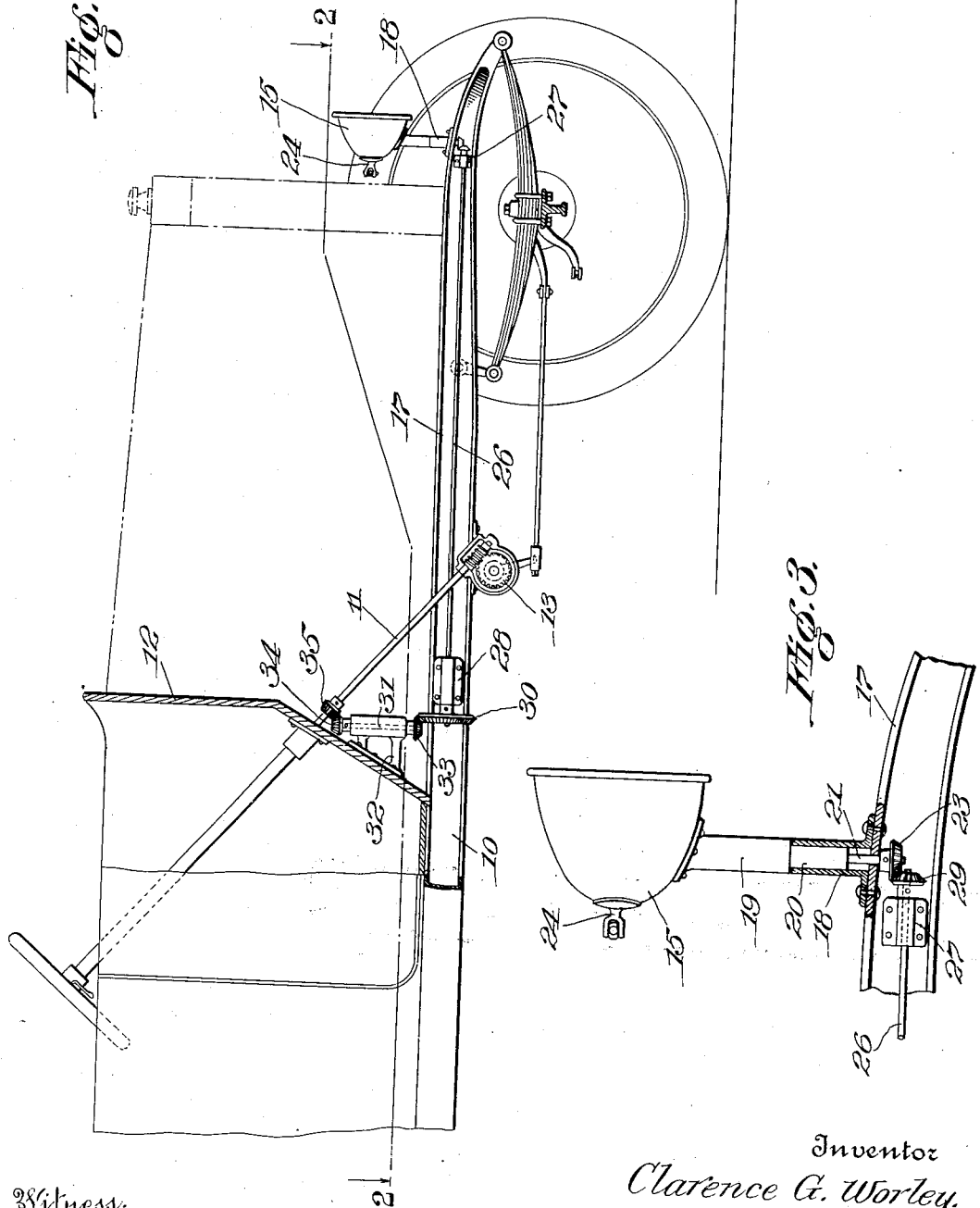

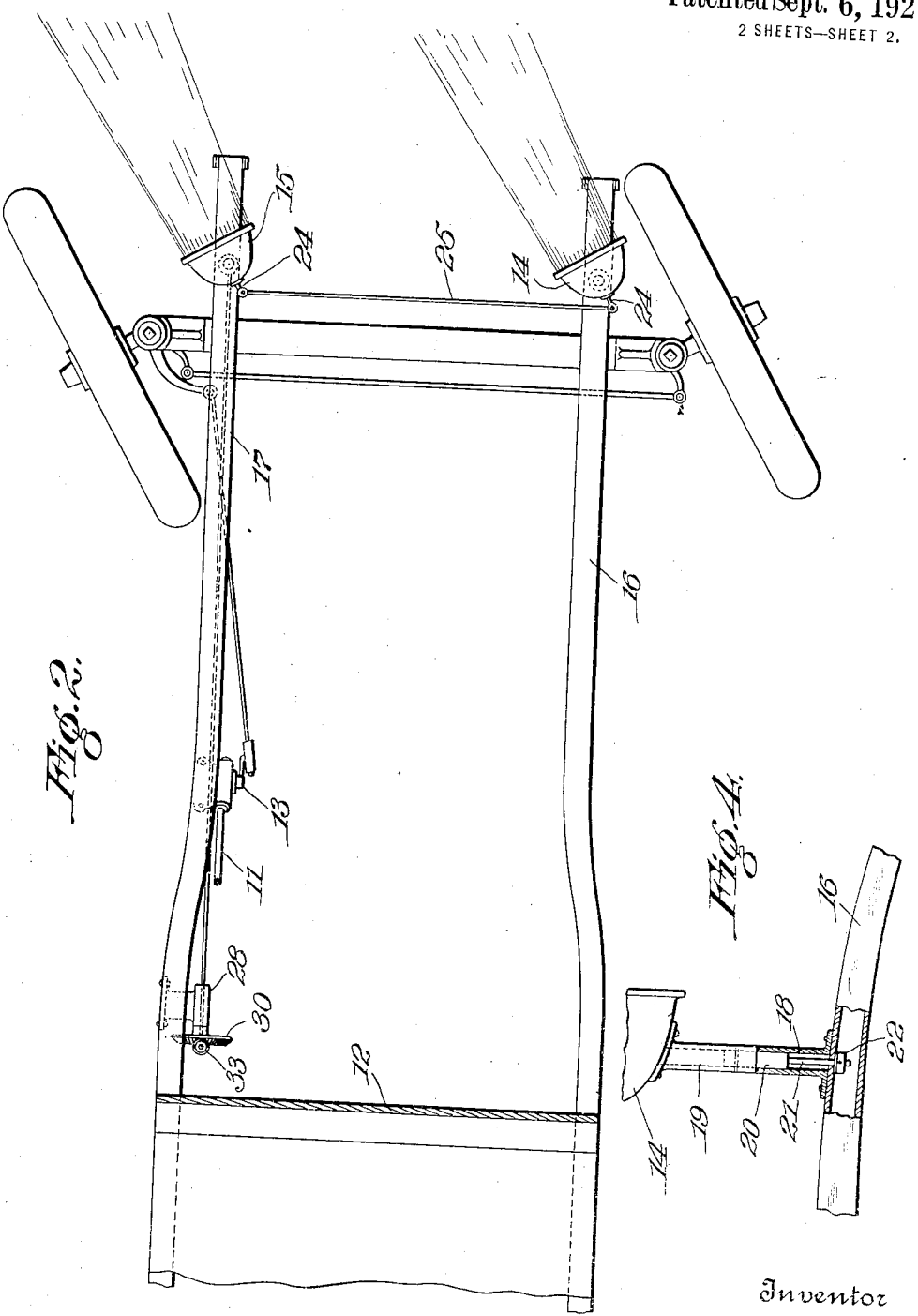

CLARENCE G. WORLEY, OF MARIETTA, GEORGIA.

AUTOMOBILE-HEADLIGHT.

1,389,726.  Specification of Letters Patent.  Patented Sept. 6, 1921.

Application filed October 6, 1919.  Serial No. 328,864.

*To all whom it may concern:*

Be it known that I, CLARENCE G. WORLEY, a citizen of the United States, residing at Marietta, in the county of Cobb and State of Georgia, have invented certain new and useful Improvements in Automobile-Headlights, of which the following is a specification.

This invention relates to improvements in automobile headlights and particularly to means for changing the direction of the beam of light so it will precede the course of the automobile.

An object of the invention is to connect the headlights with the steering post of the automobile in such a manner as to turn them by the steering post when the front wheels are turned, and to the same extent, so that the beam of light will always be cast in the direction in which the automobile is moving.

Another object of the invention is to so position the mechanism required for connecting the steering post with the headlights that it will not interfere with parts of the engine, steering mechanism, or other parts of the machine, and will also be protected from damage.

A further object of the invention is to provide mechanism for controlling the headlights by the steering post which will be simple in construction and require a minimum number of parts, thereby reducing the cost of manufacture and increasing the efficiency.

Further objects and details of the invention will appear as described in connection with the accompanying drawings and hereafter set forth and claimed.

Referring to the drawings forming a part of this specification, like numerals of reference designate corresponding parts throughout the several views, in which—

Figure 1 is a side elevation of a portion of an automobile, parts being shown in section, illustrating the application of my invention.

Fig. 2 is a sectional view taken on line 2—2 of Fig. 1, showing a plan of the frame and parts of the automobile, with my invention applied thereto.

Fig. 3 is a detail view with parts broken away and in section of the left hand headlight illustrated in Figs. 1 and 2, and, Fig. 4 is a similar view of the right hand headlight illustrated in Fig. 2.

The drawings illustrate the front end of an automobile, having the usual type of frame 10 and the steering post 11 passing through the dashboard 12 with a worm gear drive 13 connecting with the steering knuckle for turning the front wheels.

In carrying out my invention I pivotally mount the headlights 14 and 15 on the frame members 16 and 17 near the front ends thereof. The headlight posts 18 for each of the headlights comprises tubular bearing members fastened to the frame members 16 and 17 in any suitable manner, as by bolts or rivets. The corresponding pivot members on the headlights 14 and 15 comprise tubular members 19 fastened to the headlights and provided with shafts 20 which extend into the posts 18 to form the pivot bearing. Extending from the shafts 20 are smaller shafts 21 which extend down through posts 18 and end within the channel of the frame members 16 and 17. The shaft 21 connected with the headlight 14 has a fastening member 22 applied to its end when the headlight is placed on the post for holding it in position. The shaft 21 connected with the headlight 15 has a double function; a bevel gear 23 is fastened to the end of the shaft in the channel of the frame member 17 for holding the headlight in position and for turning it. Each of the headlights is provided with a projection 24 which pivotally engages a connecting rod 25 for causing the headlights to turn together.

Within the frame member 17 is mounted a shaft 26 in suitable bearings 27 and 28. Upon this shaft is mounted a beveled driving gear 29 which engages the gear 23 on the head-light shaft, and at the opposite end of the shaft which is shown as extending outside of the channel is a beveled gear 30. A shaft 31 is suitably mounted in a bearing 32 fastened to the dashboard 12 and has a beveled driving gear 33 meshing with the driven gear 30, and a driven beveled bear 34 which meshes with a driving beveled gear 35 fastened on the steering post 11.

The operation of my headlight mechanism is as follows: Upon turning the steering post 11 which turns the front wheels by the worm gear drive 13 and other usual connections with the wheels, the gear 35 which is fastened to the steering post turns 34 on shaft 31: gear 33 on this shaft turns gear 30 on shaft 26: gear 29 on shaft 26 turns gear 23 turning the shaft 21 and headlight 15 and the connecting rod 25 coupling the headlights causes both to turn the same amount. Thus when the steering rod 11 is turned to turn the wheels, the headlights will be simultaneously turned in the same direction.

In order to turn the headlights through the same angle as the wheels are turned the ratio between the gear connections between the steering post 11 and the headlights must be same as between the steering post and the steering knuckle, which depends upon the ratio of the worm and gear drive 13. To provide for this I use reducing gears 33 and 30 between shafts 31 and 26 which will give the desired ratio. It will be seen that in equipping various types of automobiles with my invention in which the ratio of the steering mechanism may vary, I will have to provide for turning the headlights at various ratios from the steering post. For this purpose I make my device with provisions for interchangeable gears 33 and 30 on shafts 31 and 26 so that it can be installed on any automobile without difficulty.

In reduction to practice, I have found that the form of my invention illustrated in the drawings and referred to in the above description, as the preferred embodiment, is the most efficient and practical; yet realizing that the conditions concurrent with the adoption of my device will necessarily vary. I desire to emphasize the fact that various minor changes in details of construction, proportion and arrangement of parts may be resorted to, when required, without sacrificing any of the advantages of my invention as defined in the following claims.

1. The combination with an automobile, of two headlights pivotally mounted on the frame of the automobile, a connection between the headlights whereby when one headlight is turned upon its pivot the other headlight will be turned, a shaft extending from each headlight through its post into the frame, means on one of said shafts for fastening the headlight in its post, means comprising a gear on the other shaft for fastening the headlight in its post, a shaft mounted within the frame having a driving gear meshing with said first gear, a driven gear on the other end of said shaft, a shaft mounted in a bearing fastened to the dashboard having a driving gear meshing with the last said gear and a driven gear meshing with a gear fastened on the steering post of the automobile whereby when the steering post is operated to turn the wheels the headlights will be correspondingly turned.

2. The herein described improvements in automobile headlights comprising a pair of headlights adapted to be pivotally mounted on the front ends of the side frame members of the automobile, a rod connecting said headlights whereby they will be turned together, pivot shafts for the headlights adapted to extend into said side frame members, a shaft adapted to be positioned within one of the side frame members and having a driving connection with one of the pivot shafts, and means adapted to be positioned on the automobile dashboard beneath the steering posts for providing a driving connection from the steering posts to the last said shaft.

In testimony whereof I affix my signature.

CLARENCE G. WORLEY.